United States Patent
Häfner et al.

(10) Patent No.: US 9,564,829 B2
(45) Date of Patent: Feb. 7, 2017

(54) CONVERTER ARM AND ASSOCIATED CONVERTER DEVICE

(71) Applicant: ABB TECHNOLOGY LTD, Zürich (CH)

(72) Inventors: Jürgen Häfner, Ludvika (SE); Hans Björklund, Ludvika (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 14/419,716

(22) PCT Filed: Oct. 1, 2012

(86) PCT No.: PCT/EP2012/069348
§ 371 (c)(1),
(2) Date: Feb. 5, 2015

(87) PCT Pub. No.: WO2014/053156
PCT Pub. Date: Apr. 10, 2014

(65) Prior Publication Data
US 2015/0229229 A1 Aug. 13, 2015

(51) Int. Cl.
*H02M 7/49* (2007.01)
*H02M 7/217* (2006.01)
(Continued)

(52) U.S. Cl.
CPC .............. *H02M 7/217* (2013.01); *H02M 7/49* (2013.01); *H02M 7/537* (2013.01); *H02M 1/092* (2013.01);
(Continued)

(58) Field of Classification Search
CPC ................. H02M 1/092; H02M 2007/4835; H02M 2001/0077; H04B 10/271; H04B 10/275; Y02E 40/26
See application file for complete search history.

(56) References Cited

U.S. PATENT DOCUMENTS 5,886,803 A * 3/1999 Yamamoto ........... H04B 10/272
375/239
6,038,044 A * 3/2000 Fee ..................... H04B 10/27
398/1
(Continued)

FOREIGN PATENT DOCUMENTS

CN WO 2011091627 A1 * 8/2011 .......... H04L 12/437
EP 2 458 726 A1 5/2012
(Continued)

Primary Examiner — Harry Behm
(74) Attorney, Agent, or Firm — Birch, Stewart, Kolasch & Birch, LLP

(57) ABSTRACT

It is presented a converter arm for power conversion. The converter arm comprises: a plurality of converter cells, wherein each converter cell comprises a plurality of semiconductor switches, an energy storage element and at least three control signal connections arranged to control the conducting state of the plurality of semiconductor switches. Each converter cell is connected to receive a control signal from at least three entities via said control signal connections, wherein at least two of the three entities are neighboring converter cells, and each converter cell is arranged to forward a control signal to all connected neighboring converter cells via said control signal connections. A corresponding converter device is also presented.

20 Claims, 3 Drawing Sheets

(51) Int. Cl.
*H02M 7/537* (2006.01)
*H02M 1/092* (2006.01)
*H02M 1/00* (2006.01)
*H02M 7/483* (2007.01)
*H02M 1/32* (2007.01)

(52) U.S. Cl.
CPC ............... *H02M 2001/0003* (2013.01); *H02M 2001/325* (2013.01); *H02M 2007/4835* (2013.01)

(56) References Cited

U.S. PATENT DOCUMENTS

| | | | |
|---|---|---|---|
| 8,270,316 B1* | 9/2012 | Chang | G06F 15/7842 370/254 |
| 2004/0176146 A1* | 9/2004 | Kim | 455/572 |
| 2010/0017654 A1* | 1/2010 | Wishneusky | 714/15 |
| 2011/0019442 A1* | 1/2011 | Yamada et al. | 363/44 |
| 2012/0113698 A1 | 5/2012 | Inoue et al. | |
| 2012/0300619 A1* | 11/2012 | Fu et al. | 370/222 |
| 2013/0223115 A1* | 8/2013 | Tsuchiya | H02M 7/49 363/68 |

FOREIGN PATENT DOCUMENTS

| | | | | |
|---|---|---|---|---|
| JP | 1-114362 A | 5/1989 | | |
| JP | 1-222653 A | 9/1989 | | |
| JP | 11-196564 A | 7/1999 | | |
| JP | WO 2012060250 A1 * | 5/2012 | ............. | H02M 7/49 |
| WO | WO 2010/145688 A1 | 12/2010 | | |
| WO | WO 2011/120572 A1 | 10/2011 | | |

* cited by examiner

CONVERTER ARM AND ASSOCIATED CONVERTER DEVICE

TECHNICAL FIELD

The invention relates to a converter arm for power conversion.

BACKGROUND

High Voltage Direct Current (HVDC) is increasing in usage due to a number of benefits compared to AC (Alternating Current) for power transmission. In order to connect a HVDC link or an HVDC grid to an AC grid, conversion needs to occur from DC (Direct Current) to AC or AC to DC. This conversion can for example be performed using voltage source converters (VSC).

In the voltage source converters, converter cells are controlled by a main controller to synthesize the conversion. When there are many converter cells, each cell needs to be able to receive a control signal from the main controller, which can get complicated when the number of converter cells is large.

WO 2011/120572 presents a voltage source converter for high voltage DC power transmission and reactive power compensation. A presented voltage source converter includes a pair of serial assemblies arranged adjacent to one another to form a ring. Local data transmission links allow slave converter cells of the serial assemblies to receive data from and transmit data to each other. This provides a back-up communication route in the event of a communication failure between a global control unit and a master converter cell of one of the serial assemblies.

However, if possible, it would be beneficial to improve reliability even further in the way control signals are provided to the converter cells.

SUMMARY

It is an object to improve fault tolerance when control signals are provided to converter cells of a converter arm.

According to a first aspect it is presented a converter arm for power conversion. The converter arm comprises: a plurality of converter cells, wherein each converter cell comprises a plurality of semiconductor switches, an energy storage element and at least three control signal connections arranged to control the conducting state of the plurality of semiconductor switches. Each converter cell is connected to receive a control signal from at least three entities via said control signal connections, wherein at least two of the three entities are neighbouring converter cells, and each converter cell is arranged to forward a control signal to all connected neighbouring converter cells via said control signal connections. In this way, a control signal provided to the converter arm floods the converter cells of the converter arm. Significantly, this arrangement provides great redundancy and resistance to any faults which may affect one or more of the converter cells.

The converter arm may further comprise a shortcut connection between two non-neighbouring converter cells wherein the non neighbouring converter cells each comprises at least four control signal connections. Such a shortcut connection reduces maximum delay in providing a control signal to all converter cells.

Each converter cell may be arranged to detect a blocking message supplied to the control signal connections separately from other messages supplied to the control signal connections, wherein the Mocking message instructs the converter cell to turn off all semiconductor switches of the converter cell. By detecting the Mocking message separately, the Mocking message can be detected quicker than if the complete, regular message decoding would be used. This allows blocking messages to be forwarded quicker and thus propagate to all cells quicker.

Each converter cell may be arranged to detect and forward the Mocking message without fully decoding a control signal comprising the Mocking message.

Four of the converter cells may be directly connected to a main controller, arranged to generate control signals arranged to control the conducting state of the plurality of semiconductor switches of the converter cells. These four converter cells can be provided on either side of the converter arm, with any other converter cells connected between these four converter cells. With this arrangement, two failed cells can never affect the controllability of any other cells. In fact, in many cases, three or more converter cells at distributed locations can fail without affecting the controllability of other cells.

The converter cells directly connected to the main controller may be connected to only two neighbouring converter cells, and any converter cells not directly connected to the main controller are, in such an embodiment, connected to three neighbouring converter cells.

Each converter cell may comprise a cell controller and the at least three control signal connections of each converter cells may be connected to the cell controller, wherein the cell controller may be arranged to control the semiconductor switches of the converter cell via respective gate units arranged to condition control signals for the semiconductor switches to a suitable format.

Each converter cell may comprise an auxiliary power input, wherein each auxiliary power input may be arranged to power control functions of the respective converter cell without charging the energy storage element of the respective converter cell. In this way, the control functionality of an entire converter arm with interconnected converter cells can be tested without having to power the main power line. This can be particularly useful during installation or for fault management.

The converter arm may further comprise at least one battery connected to the auxiliary power inputs of the converter cells. The battery provides sufficient reliability and is easily replaced at time of installation or fault management if required.

Each converter cell may comprise a battery connected to its auxiliary power input.

Each one of the control signal connections may be a bidirectional connection.

Each one of the control signal connections may be arranged to communicate via optical connections.

According to a second aspect, it is presented a converter device for converting power in at least one direction between an alternating current, AC, and a direct current, DC, comprising at least one converter arm according to the first aspect.

The converter device may comprise a plurality of phase legs connected in parallel between terminals of a DC connection, and each phase leg may comprise at least one converter arm according to the first aspect.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
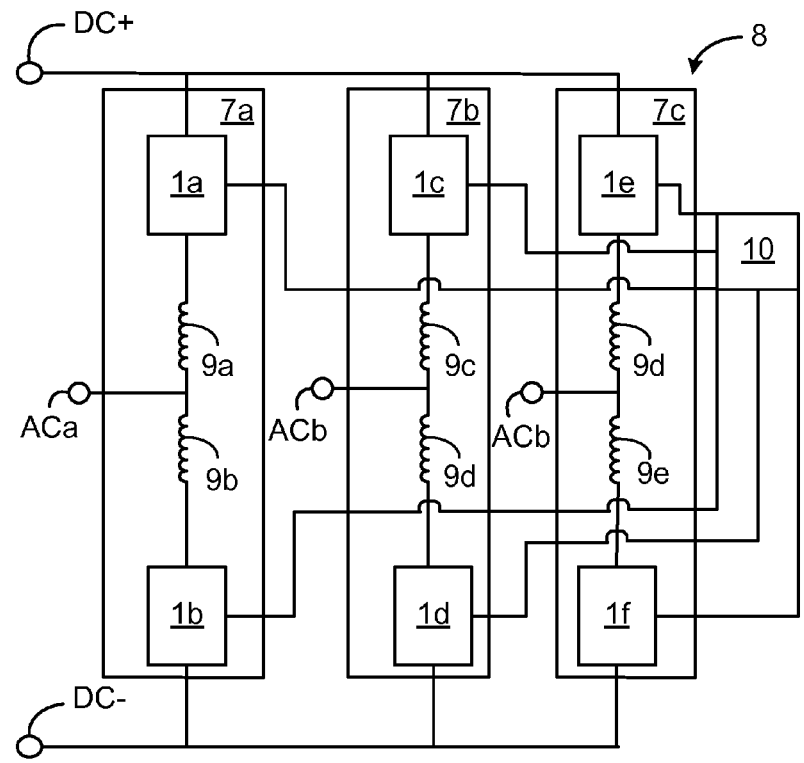
FIG. 1 is a schematic diagram illustrating one embodiment of a converter device for converting between DC and AC.

FIG. 1 is a schematic diagram illustrating one embodiment of a converter device 8 for converting between DC and AC. The DC connection comprises a positive terminal DC$^+$ and a negative terminal DC$^-$ and can be an HVDC connection. The AC connection in this embodiment is a three phase connection comprising three AC connections AC$_a$, AC$_b$ and AG and can be connected e.g. to an AC grid. While the converter device 8 is here shown with three phases, the converter device 8 can equally well have one, two, four or more phases.

Since there are three phases here, there are three phase legs 7a-c. The three phase legs 7a-c are connected in parallel between terminals DC$^+$, DC$^-$ of the DC connection. In this embodiment, a first phase leg 7a comprises a first converter arm 1a, a first inductor 9a, a second inductor, 9b and a second converter arm 1b connected serially between the terminals DC$^+$, DC$^-$ of the DC connection. Analogously, a second phase leg 7b comprises a third converter arm 1c, a third inductor 9c, a fourth inductor, 9d and a fourth converter arm 1d connected serially between the terminals DC$^+$, DC$^-$ of the DC connection, and a third phase leg 7c comprises a fifth converter arm 1e, a fifth inductor 9e, a sixth inductor, 9f and a sixth converter arm 1f connected serially between the terminals DC$^+$, DC$^-$ of the DC connection. The AC terminals AC$_a$, AC$_b$ and AC$_c$ are provided between the inductors 9a-b of the respective phase legs 7a-c. Optionally, only one inductor is provided in each phase leg 7a-c.

A main controller 10 is connected to all converter arms 1a-f and sends control signals to control the operation of the converter arms 1a-f. In this way, the main controller 10 controls the operation of the converter arms for conversion from AC to DC or from DC to AC. The converter device 8 can be unidirectional in either direction between AC and DC or bidirectional. The converter device 8 in this embodiment is a voltage source converter. One control signal type that can be sent from the main controller 10 to one or more of the converter arms 1a-f is a Mocking message. A Mocking message instructs the converter arm to turn off all semiconductor switches of the converter cell.

While the converter device 8 is here shown with two converter arms for each phase leg, each phase could comprise any suitable number (1, 2, 3, etc.) of serially connected converter arms, controller by the main controller 10. In particular, if there is a large number of converter cells needed for a phase leg, the phase leg can comprise more than two converter arms.

Figure 2A:
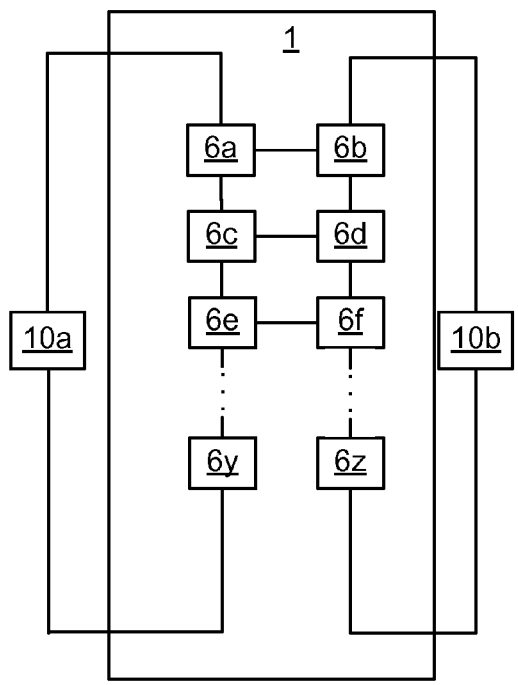
FIGS. 2A-B are schematic diagrams illustrating the structure of converter arms of the converter device of FIG. 1 according to three embodiment with varying connectivity options to the main controller.
Figure 2B:
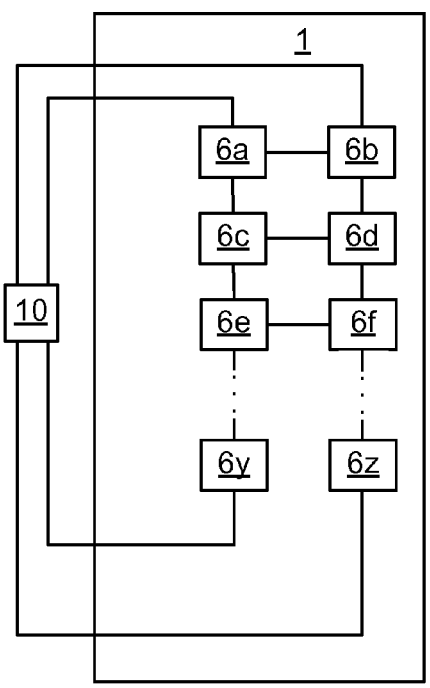

FIGS. 2A-B are schematic diagrams illustrating the structure of converter arms 1 of the converter device 8 of FIG. 1 according to two embodiments with varying connectivity options to one or more main controllers. The converter arm 1 can be any one of the converter arms 1a-f shown in FIG. 1. First, the structure of the converter arm shown in FIG. 2A will be described.

The converter arm 1 comprises a plurality of converter cells 6a-6z. Two converter cells 6a, 6y are connected to a first main controller and two converter cells 6b are connected to a second main controller. The two main controllers 10a-b are redundant and operate in the same way, with one main controller being active and one main controller being in hot standby. The controller in hot standby is able to step in and quickly take over control if needed, e.g. due to a failing active main controller or some converter cells being unreachable from the active main controller due to failing converter cells.

The number of converter cells in the converter arm can vary greatly from installation to installation and can e.g. reach hundreds of converter cells. Each converter cell 6a-z comprises a switching cell with semiconductor switches and an energy storage element, as will be explained in more detail below. Furthermore, each converter cell 6a-z comprises at least three control signal connections, where a control signal provided on any one of the control signal connections controls the conducting state of the semiconductor switches of the converter cell. The control signal connections are bidirectional connections.

Each converter cell 6a-z is connected to receive a control signal from either one of at least three neighbouring entities. Neighbouring is here to be interpreted as adjacent with a direct control signal connection. For example, a first converter cell 6a has two, and only two, neighbouring converter cells: a second converter cell 6b and a third converter cell 6c. Moreover, the first converter cell 6a is directly connected to the first main controller boa.

As shown in FIG. 2A, at least two of the three entities for each converter cell are neighbouring converter cells. See for example converter cells 6a-b and 6y-z which are respectively connected to two neighbouring converter cells and one of the main controllers 10a-b. Other converter cells are connected to three neighbouring converter cells, see e.g. converter cells 6c-f. More particularly, for instance the third converter cell 6c has three, and only three, neighbouring converter cell: the first converter cell 6a, a fourth converter cell 6d and a fifth converter cell 6e.

Furthermore, each one of the converter cells 6a-z is arranged to forward a received control signal to all connected neighbouring converter cells (and the main controllers 10a-b, if connected to one of the control signal connections). Each converter cell is configured to perform this action of control signal forwarding autonomously, without additional external control.

In this way, a control signal from the main controllers 10a-b floods the converter cells 6a-z of the converter arm with the control signal. Significantly, this arrangement provides great redundancy and resistance to any faults which may affect one or more of the converter cells, even though the main controllers 10a-b only needs to be connected on two sides of the converter cells, with two converter cells connected to the main controllers 10a-b on either side. That is, four converter cells 6a-b, 6y-z are connected to the main controllers 10a-b.

Say, for example, that a first converter cell 6a fails and then another converter cell 6f fails. In systems of the prior art, a failure of two converter cells can affect the controllability of many other converter cells. In contrast, with this arrangement, two failed cells can never affect the controllability of any other cells. In fact, in most cases, three or more converter cells can fail without affecting the controllability of other cells. In the prior art, the only way to reach such resilience to errors is by providing a connection between each individual converter cell and a main controller, which is a costly solution if the number of converter cells is high.

In the structure of FIG. 2A, the redundant two main controllers 10a-b are directly connected to the converter arm 1, to four converter cells 6a-b, 6y-z.

The embodiment illustrated in FIG. 2B is similar to the embodiment illustrated in FIG. 2A. Here, however, there is a single main controller 10 with four individual connections from the main controller to the four connections to the connected converter cells 6a-b, 6y-z. This embodiment provides a simpler and less expensive solution compared to the embodiment of FIG. 2A.

Figure 3:
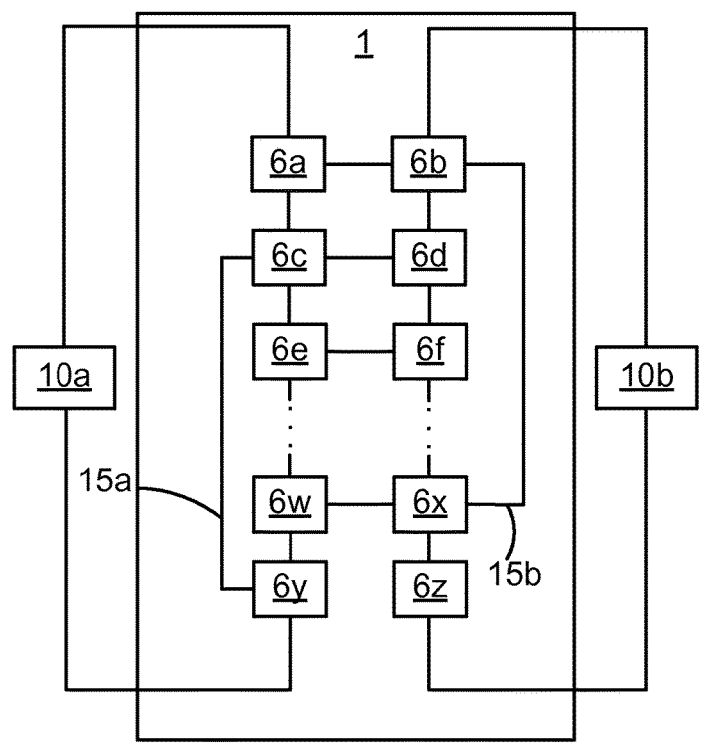
FIG. 3 is a schematic diagram illustrating the structure of a converter arm of the converter device of FIG. 1 according to one embodiment.

FIG. 3 is a schematic diagram illustrating the structure of a converter arm 1 of the converter device 8 of FIG. 1 according to one embodiment. This embodiment is similar to the embodiment of FIGS. 2A-B, but also comprising shortcut connections 15a-b.

A first shortcut connection 15a is provided between a first converter cell 6c and a second converter cell 6y. In order to make the shortcut connection 15a a shortcut, the first and second converter cells 6c,y are not neighbouring converter cells.

Optionally, a second shortcut connection 15b is provided between a third converter cell 6b and a fourth converter cell 6x. Also here, in order to make the shortcut connection 15b a shortcut, the third and fourth converter cells 6b,x are not neighbouring converter cells.

The converter cells connected to the shortcut connections 15a-b treat the control signal connection just like any other of the control signal connections and receive and/or forward control signals on this input in the same way as for the other control signal connections.

Using the shortcuts 15a-b, and since there is a small delay introduced for each time a control signal passes through a control cell, the maximum delay for a control signal to be propagated from the main controller 10 to all converter cells is reduced. This can be particularly useful e.g. for Mocking messages. Optionally, more shortcut connections can be provided to further reduce the maximum delay for the control signal propagation.

All converter cells connected to a shortcut connection 15a-b have an additional control signal connection, and thus have (at least) four control signal inputs.

Figures 4A, 4B:
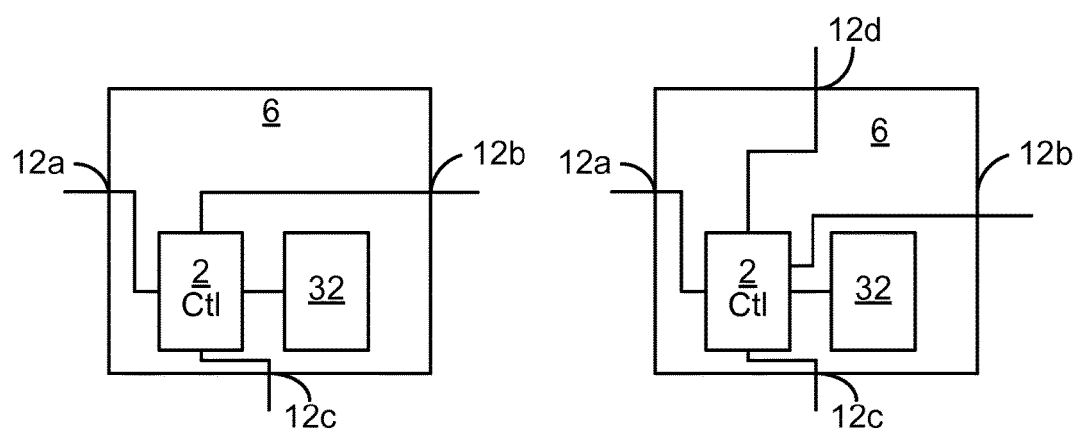
FIG. 4A-B are schematic diagrams illustrating the structure of two embodiments of a converter cell of FIGS. 2A-B or FIG. 3.

FIG. 4A-B are schematic diagrams illustrating the structure of two embodiments of a converter cell 6 of FIGS. 2A-B or FIG. 3. FIG. 4A shows one embodiment of a converter cell 6 that can be any one of the converter cells of FIGS. 2A-B and any one of the converter cells of FIG. 3 which are not connected to a shortcut connection, i.e. a converter cell with three control signal connections.

The converter cell 6 comprises a cell controller 2 and a switching cell 32. The cell controller 2 is connected to three control signal connections 12a-c, to receive and/or forward control signals to neighbouring converter cells and/or a main controller, as described above. Each control signal connection 12a-c can for example be configured to send and/or receive control signals using an optical fibre, e.g. using EtherCAT, or any other suitable communication protocol.

When a control signal is received on any one of the control signal connections 12a-c, the cell controller 2 forwards the control signal to the switching cell 32 and to all other control signal connections (other than the control signal connection over which the control signal was received). In this way, any input control signal is flooded to all control signal connections.

FIG. 4B is illustrates another embodiment of a converter cell 6 that can be any one of the converter cells of FIG. 3 which is connected to a shortcut connection, i.e. a converter cell with four control signal connections. The converter cell 6 in this embodiment is similar to the controller cell in the embodiment of FIG. 4A. In this embodiment though, there are four control signal connections 12a-d, to be able to accommodate also a control signal connection over a shortcut connection.

Figure 5:
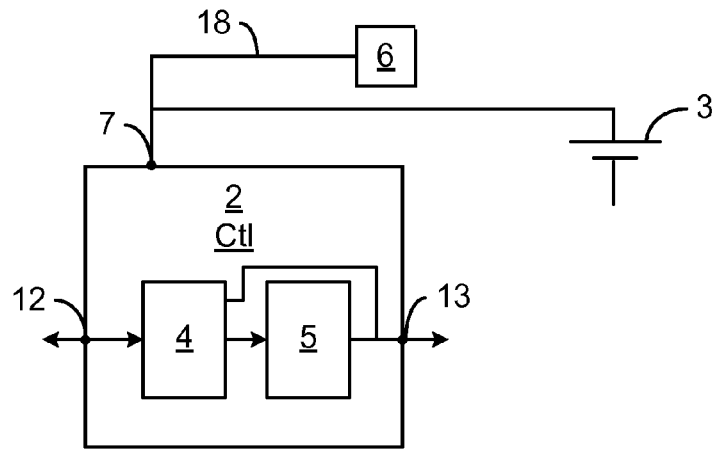
FIG. 5 is a schematic diagram illustrating the cell controller of FIGS. 4A-B according to one embodiment.

FIG. 5 is a schematic diagram illustrating the cell controller of FIGS. 4A-B according to one embodiment. For clarity, all control signal connections are here represented by a single control signal connection 12. A switching cell connection 13 sends control signals to the switching cell (see FIG. 4A-B). In this embodiment, the cell controller 2 comprises a fast decoder 4 and a main decoder 5. The fast decoder 4 is arranged such that it decodes a blocking message supplied to at least one of the control signal inputs 12 separately from other messages supplied to at least one of the control signal inputs. For instance, the blocking message can be detected and forwarded without fully decoding the message supplied to the control signal inputs. When a blocking message is received, a Mocking signal (such as the Mocking message) is sent to the switching cell connection 13 either directly or via the main decoder 5. Messages other than Mocking messages are simply forwarded to the main decoder 5.

One way to implement the fast decoder is that blocking messages are sent in a format which does not conform to standardised protocols on the communication channel for the control signal connections. In other words, signal magnitude, timing, and/or frequency, etc. could be out of bounds for normal communication on the communication channel for the control signal connections. This allows for fast and efficient differentiation of the Mocking message without having to properly decode the message using the main decoder 5.

During commission or at other times, the cell controller may need to be tested. In cases where the cell controller is normally powered by the main power line (e.g. the DC connection of FIG. 1), high voltages could be present. The high voltages make it unsafe for operators to be present, which prevents efficient testing or even testing at all. Thus, optionally, the cell controller 2 is comprises an auxiliary power input 7 for powering the cell controller when the main power line is not powered. The auxiliary power input 7 is not connected to charge any energy storage element of a connected switching cell and can be a low voltage power input, in the order of tens of volts DC, e.g. 24V. By powering control functions of the converter cells and not charging the energy storage element, an entire converter arm with interconnected converter cells can be tested without having to power the main power line.

For example, a battery 3 can be provided to power the cell controller 2. The battery 3 can be provided for a subset of the converter cells or for all converter cells.

In another embodiment, a neighbouring cell 6 is alternatively or additionally connected to the auxiliary power input 7 of the cell controller 2. In this way, the cell controller can in some cases still forward control signal messages even when its connected switching cell has failed, further increasing reliability of control signal propagation between converter cells.

Figures 6A, 6B:
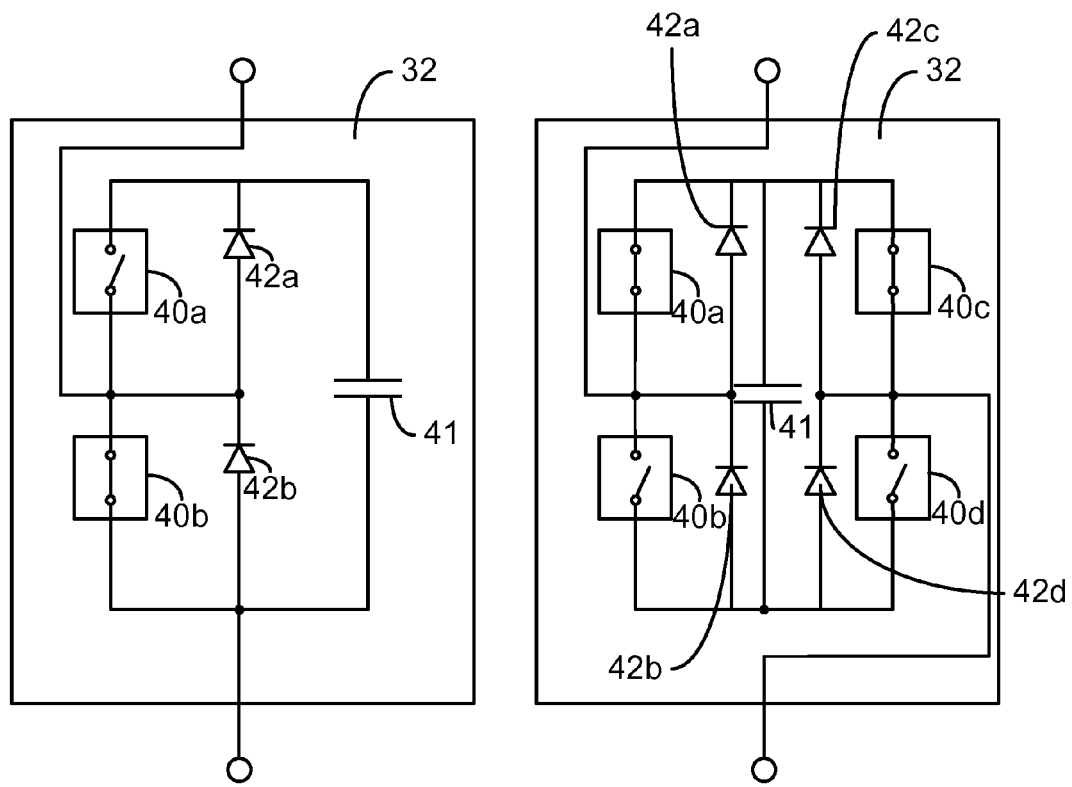
FIG. 6A-B are schematic diagrams illustrating embodiments of switching cells of the converter cells of FIGS. 4A-B.

FIGS. 6A-B are schematic diagrams illustrating embodiments of switching cells 32 of the converter cells of FIGS. 4A-B. A switching cell 32 is a combination of one or more semiconductor switches, such as transistors, and one or more energy storing elements, such as capacitors, supercapacitors, inductors, batteries, etc. Optionally, a switching cell can be a multilevel converter structure such as a flying capacitor or MPC (Multi-Point-Clamped) or ANPC (Active-Neutral-Point-Clamped) multilevel structure. Optionally, a gate unit is provided for each semiconductor switch to condition an input control signal to a format suitable and/or optimal for the connected semiconductor switch.

FIG. 6A illustrates a switching cell 32 implementing a half bridge structure. The switching cell 32 here comprises a leg of two serially connected active components in the form of switches 40a-b, e.g. IGBTs (Insulated-Gate Bipolar Transistors), IGCTs (Insulated Gate-Commutated Thyristors), GTOs (Gate Turn-Off thyristors), etc. A leg of two serially connected diodes 42a-b is connected with the leg of serially connected switches 40a-b as shown in the figure, in effect in parallel with the two switches 40a-b. An energy storage component 41 is also provided in parallel with the leg of transistors 40a-b and with the leg of diodes 32a-b. The voltage synthesized by the switching cell can thus either be zero or the voltage of the energy storage component 41.

FIG. 6B illustrates a switching cell 32 implementing a full bridge structure. The switching cell 32 here comprises four switches 40a-d, e.g. IGBTs, IGCTs, GTOs, etc. An energy storage component 41 is also provided in parallel across a first leg of two transistors 40a-b and a second leg of two transistors 40c-d. Compared to the half bridge of FIG. 6A, the full bridge structure allows the synthesis of a voltage capable of assuming both signs, whereby the voltage of the switching cell can either be zero, the voltage of the energy storage component 41, or a reversed voltage of the energy storage component 41. Respective diodes 42a-d are provided in parallel with the switches 40a-d, e.g. in an antiparallel fashion.

In FIGS. 6A-B, a switch with a parallel diode can be provided together, e.g. using a Reverse Conducting (RC) IGBT, RC-IGCT or BiGT (Bi-mode Insulated Gate Transistor).

It is to be noted that while the switching cell 32 is exemplified in FIGS. 6A-B using a half bridge cell and a full bridge switching cell, the embodiments presented herein are not limited to these examples and are applicable with any suitable configuration of a switching cell.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A converter arm of a phase leg for power conversion comprising:
a plurality of converter cells, wherein each converter cell comprises a plurality of semiconductor switches, an energy storage element and at least three control signal connections arranged to control the conducting state of the plurality of semiconductor switches;
wherein each converter cell is connected to receive a control signal from at least three entities via said control signal connections, wherein at least two of the three entities are neighbouring converter cells, and each converter cell is arranged to forward a control signal to all connected neighbouring converter cells via said control signal connections,
wherein at least two of the converter cells of the converter arm of the phase leg are directly connected to a main controller.

2. The converter arm according to claim 1, further comprising a shortcut connection between two non-neighbouring converter cells wherein the non neighbouring converter cells each comprises at least four control signal connections.

3. The converter arm according to claim 2, wherein each converter cell is arranged to detect a blocking message supplied to the control signal connections separately from other messages supplied to the control signal connections, wherein the blocking message instructs the converter cell to turn off all semiconductor switches of the converter cell.

4. The converter arm according to claim 2, wherein four of the converter cells are directly connected to a main controller, arranged to generate control signals arranged to control the conducting state of the plurality of semiconductor switches of the converter cells.

5. The converter arm according to claim 2, wherein each converter cell comprises a cell controller and the at least three control signal connections of each converter cells are connected to the cell controller, wherein the cell controller is arranged to control the semiconductor switches of the converter cell via respective gate units arranged to condition control signals for the semiconductor switches to a suitable format.

6. The converter arm according to claim 1, wherein each converter cell is arranged to detect a blocking message supplied to the control signal connections separately from other messages supplied to the control signal connections, wherein the blocking message instructs the converter cell to turn off all semiconductor switches of the converter cell.

7. The converter arm according to claim 6, wherein four of the converter cells are directly connected to a main controller, arranged to generate control signals arranged to control the conducting state of the plurality of semiconductor switches of the converter cells.

8. The converter arm according to claim 6, wherein each converter cell comprises a cell controller and the at least three control signal connections of each converter cells are connected to the cell controller, wherein the cell controller is arranged to control the semiconductor switches of the converter cell via respective gate units arranged to condition control signals for the semiconductor switches to a suitable format.

9. The converter arm according to claim 1, wherein each converter cell comprises a cell controller and the at least three control signal connections of each converter cells are connected to the cell controller, wherein the cell controller is arranged to control the semiconductor switches of the converter cell via respective gate units arranged to condition control signals for the semiconductor switches to a suitable format.

10. The converter arm according to claim 1, wherein each converter cell comprises an auxiliary power input, wherein each auxiliary power input is arranged to power control functions of the respective converter cell without charging the energy storage element of the respective converter cell.

11. The converter atm according to claim 10, further comprising at least one battery connected to the auxiliary power inputs of the converter cells.

12. The converter arm according to claim 11, wherein each converter cell comprises a battery connected to its auxiliary power input.

13. The converter arm according to claim 1, wherein each one of the control signal connections is a bidirectional connection.

14. The converter arm according to claim 1, wherein each one of the control signal connections is arranged to communicate via optical connections.

15. A converter device for converting power in at least one direction between an alternating current, AC, and a direct current, DC, comprising at least one converter arm according to claim 1.

16. The converter device according to claim 15, wherein the converter device comprises a plurality of phase legs connected in parallel between terminals of a DC connection, and each phase leg comprises at least one of said converter arms.

17. A converter arm for Dower conversion comprising:
a plurality of converter cells, wherein each converter cell comprises a plurality of semiconductor switches, an energy storage element and at least three control signal connections arranged to control the conducting state of the plurality of semiconductor switches,
wherein each converter cell is connected to receive a control signal from at least three entities via said control signal connections, wherein at least two of the three entities are neighbouring converter cells, and each converter cell is arranged to forward a control signal to all connected neighbouring converter cells via said control signal connections,
wherein each converter cell is arranged to detect a blocking message supplied to the control signal connections separately from other messages supplied to the control signal connections, wherein the blocking message instructs the converter cell to turn off all semiconductor switches of the converter cell, and
wherein each converter cell is arranged to detect and forward the blocking message without fully decoding a control signal comprising the blocking message.

18. The converter arm according to claim 17, wherein four of the converter cells are directly connected to a main controller, arranged to generate control signals arranged to control the conducting state of the plurality of semiconductor switches of the converter cells.

19. A converter arm for power conversion comprising:
a plurality of converter cells, wherein each converter cell comprises a plurality of semiconductor switches, an energy storage element and at least three control signal connections arranged to control the conducting state of the plurality of semiconductor switches;
wherein each converter cell is connected to receive a control signal from at least three entities via said control signal connections, wherein at least two of the three entities are neighbouring converter cells, and each converter cell is arranged to forward a control signal to all connected neighbouring converter cells via said control signal connections,
wherein four of the converter cells are directly connected to a main controller, arranged to generate control signals arranged to control the conducting state of the plurality of semiconductor switches of the converter cells.

20. The converter arm according to claim 19, wherein the converter cells directly connected to the main controller are connected to only two neighbouring converter cells, and any converter cells not directly connected to the main controller are connected to three neighbouring converter cells.

* * * * *